July 28, 1964  G. I. JOHANSSON  3,142,352
WHEELED VEHICLE HAVING A PIVOTED BOGIE SHAFT
Filed Sept. 11, 1961  3 Sheets-Sheet 3
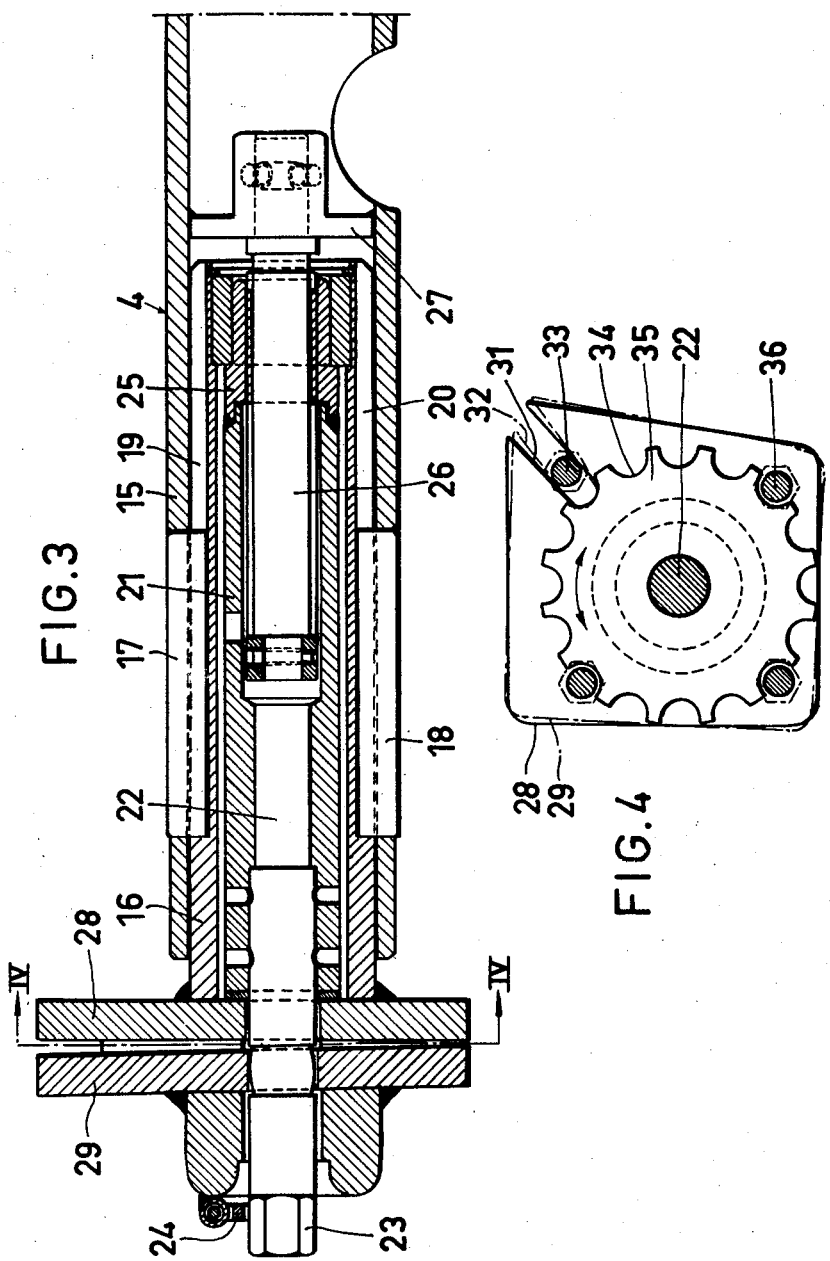

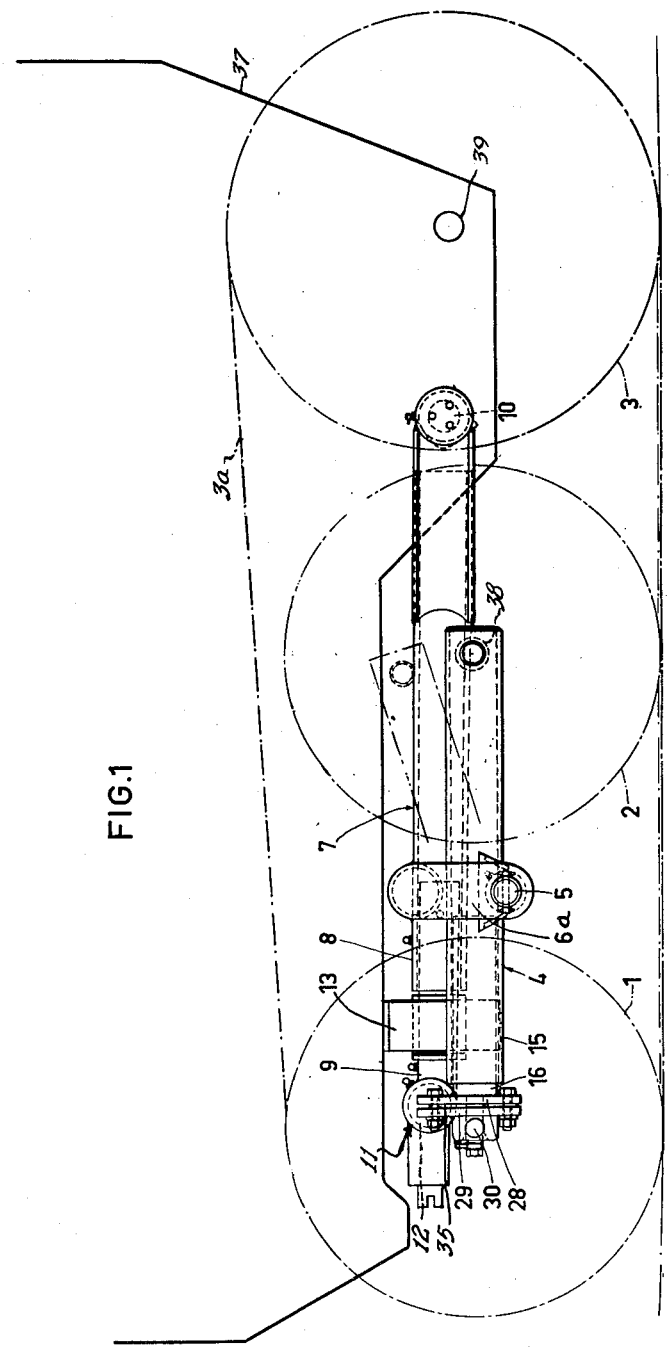

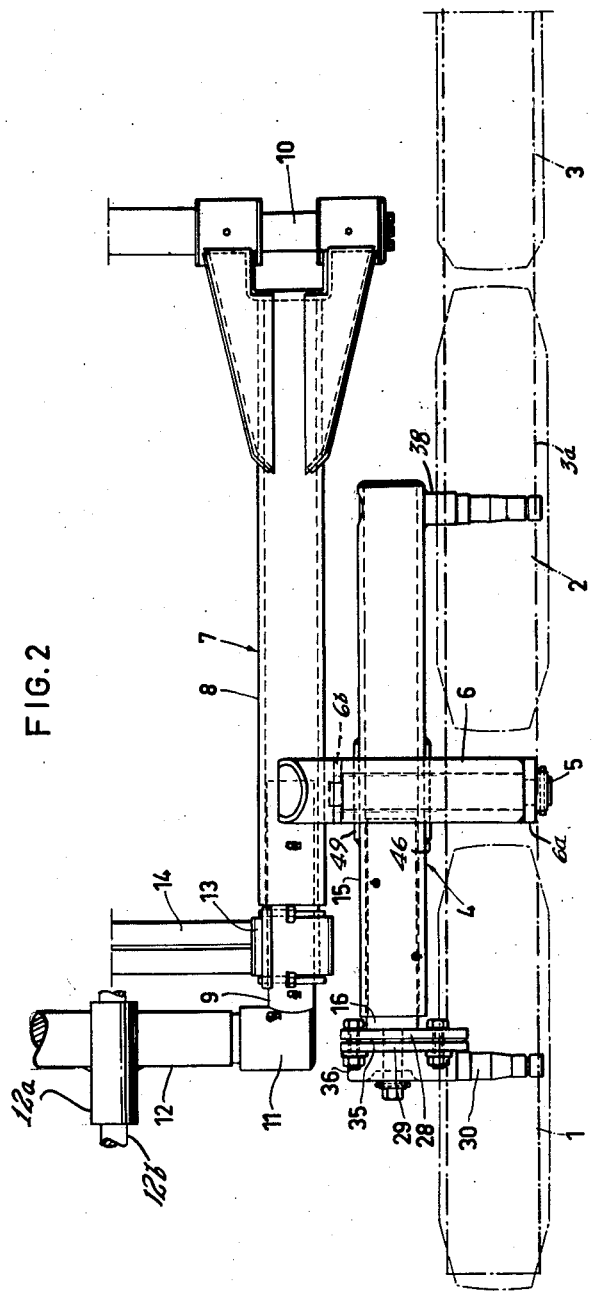

United States Patent Office 3,142,352
Patented July 28, 1964

3,142,352
WHEELED VEHICLE HAVING A PIVOTED
BOGIE SHAFT
Gustav Ingemar Johansson, Alfta, Sweden, assignor to Ostbergs Fabriks AB, Alfta, Sweden, a Swedish joint-stock company
Filed Sept. 11, 1961, Ser. No. 137,396
Claims priority, application Sweden Sept. 12, 1960
6 Claims. (Cl. 180—22)

This invention relates to an arrangement in bogies of working vehicles.

In previously known bogies the bogie shaft is rigidly mounted in the vehicle. It is obvious that such an arrangement permits full engagement between the wheels and their tracks respectively and the ground only when driving on plane ground, while in a hilly terrain the said engagement will vary. These variations result in reduced pull, decreased carrying capacity on loose ground because of the uneven distribution of pressure and, especially for track-driven vehicles, in more difficult steering.

This disadvantage is eliminated by the bogie according to the invention which is substantially characterized in that the bogie shaft connecting the wheel pair on each side of the vehicle is pivotally supported at its center by a jib connected with the respective end of a front axle mounted on the underside of the vehicle and pivoted in the vertical plane about its center.

An embodiment of the invention will be described in detail in the following, reference being had to the accompanying drawings.

FIG. 1 shows a side view of the bogie according to the invention,

FIG. 2 shows a plan view of the same bogie,

FIG. 3 shows a longitudinal section through the bogie shaft, illustrating further a camber and caster device according to the invention for the bogie front-wheels, FIG. 4 shows a cross-section of the camber and caster device along the line IV—IV in FIG. 3.

FIGS. 1 and 2 show only in a schematic manner the front wheel 1 on one bogie side, the rear wheel 2 and the drive wheel 3 of the vehicle, and a track 3a connecting wheels 1, 2 and 3 in driving relationship. The drive wheels 3 are secured to a driving shaft 39 supported in the vehicle frame 37, only roughly indicated in FIG. 1. The shafts 30 and 38 of the wheels 1 and 2, respectively, are connected by a bogie rod 4 having at its center two lugs 4a and 4b welded to each side of the rod, said lugs having openings in which a shaft 5 is secured. The ends of said shaft 5 are pivoted in two spaced plates 6a and 6b extending downwards from a jib 6, said jib being at its inner end secured to a pendulum rod 7 comprising two telescopic tubes 8 and 9, the end of said jib being secured to the outer tube 8 having its rear end pivoted about a horizontal shaft 10 which is rigidly mounted in the rear part of the vehicle frame 37. The front end of the inner tube 9 is terminated by a transversely disposed tubular portion 11 sliding freely on the end of a front shaft 12 placed on the underside of the vehicle frame 37 and pivoted in the vertical plane about its center by means of a sleeve 12a welded perpendicularly to said shaft and pivoted on a shaft 12b extending in the longitudinal direction of the vehicle and being at its ends fixed to the frame (not shown) of the vehicle. The front portion of the pendulum rod 7 is guided in vertical direction by a frame-shaped guide means 13, which is supported on a jib 14 extending from the vehicle frame 37.

It appears from the aforesaid, that due to the described arrangement unevenness of the ground will cause only a corresponding raising or lowering of the wheel-pairs on each side of the vehicle, without causing inclination of the wheels, because the pendulum rod 7 is mounted about a horizontal shaft, thus imparting to the bogie halves a pure vertical movement. As a result thereof, there will always be full engagement between the tread proper of all wheels 1, 2 and 3 and the tracks 3a of the wheels respectively and the ground, so that there will be uniform wear and safer operation. The uniform distribution of pressure obtained for track-driven vehicles will be particularly advantageous when driving on loose ground, for example snow, because the carrying capacity of the ground will increase and the vehicle will not cut through it as easily as in the case of conventional bogie constructions.

FIG. 3 shows in a schematic manner a longitudinal section through the front portion of the bogie rod 4 containing a track-stretching device. The bogie rod 4 comprises two telescopic tubes 15 and 16 which by wedges 17 and 18 secured in the outer tube 15 are prevented from rotating relative one another, the said wedges engaging with corresponding grooves 19 and 20 respectively in the inner tube 16. The inner tube 16 encloses a rotary sleeve 21 which, however, is fixed in axial direction. A rod 22 connected with the sleeve 21 extends outwardly through the front end of the bogie tube 16 and terminates in an end portion 23 adapted to rotate, which is here shown in the form of a hexagonal member adapted to be locked in desired position of rotation by a folding clamp 24. A nut means 25 rigidly secured at the end of the sleeve 21 is adapted for thread-engagement with a screw 26 projecting into the sleeve bore, the screw having its outer end fixed in a cross-wall 27 in the outer tube 15. It is clear that, upon rotating the member 23 the nut 25 rotated thereby feeds the screw 26 in the one or the other direction, thus effecting a corresponding change in length of the bogie rod 4 and thereby controlling the stretching of the track.

As appears from the aforedescribed FIGS. 1–3, the front end of the bogie rod is terminated by two cross-plates 28 and 29 which are connected with one another. The inner one 28 of the plates is fixed at the said end, and the outer plate 29 carries the shaft 30 of the front wheel 1. The plates are intended to effect the desired camber of the front-wheels on both sides of the tractor, which camber may be necessary for keeping the wheel bands in a correct position on the tires.

For rendering possible the camber about an axis which is in parallel with the bogie rod, both the inner cross-plate 28 and the outer cross-plate 29 (dash-dotted) respectively are provided, as appears from FIG. 4, with a slot 31 and 32 respectively extending from the plate edge towards the rod 22 which extends through the plates and guides the same. The said slots differ somewhat in their direction, as can be seen, so that the desired relative rotary adjustment of the plates and thereby the camber can be obtained by inserting a bolt 33 with a diameter corresponding to the width of the slots into the overlapping slots to such a depth as necessary, whereafter the bolt is fixed.

For obtaining caster in the other direction, i.e. about a vertical axis, a disc 35 provided with equally spaced recesses 34 along its periphery and decreasing in thickness from the one side edge to the other (FIGS. 1 and 3) is mounted about the rod 22 between the two plates. In the embodiment shown, the bolts 36 holding the two plates together can cooperate with the recesses 34 of the disc. For carrying out the caster, first the outer plate 29 is removed whereafter the disc 35 is drawn off the bolts 36, turned into desired position and pushed back into engagement with the bolts, whereafter the outer plate is mounted again. It is obvious that, instead of the fastening bolts for the plates, shoulders or the like provided on the one plate may serve for fixing the recesses of the disc.

The invention is, of course, not limited to the embodiment shown and various modifications are possible within the scope of the invention. For example, the telescopic nature of the bogie and pendulum rod may be effected in a manner other than by tubes extending into one another, for instance by sliding or slot connections. A person skilled in the art may, if it appears suitable, easily exchange various details of the construction by equivalent ones.

What I claim is:

1. A vehicle comprising a rigid frame, a pair of drive wheels mounted on a transverse drive shaft adjacent to the rear end of said frame, an engine mounted on said frame and connected to drive said drive shaft and drive wheels, a second shaft secured to the under side of said frame in front of and parallel to said drive shaft, a pendulum pivoted on each end of said second shaft and extending toward the front end of said frame, each pendulum comprising a tube pivoted to said second shaft and a cylindrical member rotatably and slidably telescoped into said tube and protruding forwardly therefrom, a guide secured to said frame adjacent to the protruding end of said cylindrical member, a slide secured to said cylindrical member and cooperating with said guide to permit vertical movement of the front end of said pendulum with respect to said frame, a third shaft secured to said frame and extending longitudinally thereof adjacent to the middle of the front end thereof, a fourth shaft pivoted on said third shaft and extending transversely of said frame, a tubular extension at the front end of said cylindrical member and extending at a right angle thereto, said tubular extension being pivotally and telescopically connected to one end of said fourth shaft, a jib rigidly supported on said pendulum tube, a fifth shaft rotatably and horizontally supported by said jib, a bogie rod carried by said fifth shaft and pivoted adjacent the center thereof for movement in a normally vertical plane, said bogie rod consisting essentially of a tube member and a cylindrical member telescopically and slidably mounted therein, means preventing relative rotation of said tube member and said cylindrical member of said bogie rod, a sixth shaft extending horizontally and transversely of said frame from the free end of said cylindrical member, a seventh shaft extending horizontally and transversely of said frame from the free end of said tube member and wheels rotatably mounted on said sixth and seventh shafts.

2. A vehicle as defined in claim 1 in which the length of the bogie rod between said sixth and seventh shafts is adjustable.

3. A vehicle as defined in claim 1 in which said cylindrical member of said bogie rod extends forwardly with respect to said frame and said sixth shaft is mounted on an adjustable plate secured to the front end of said cylindrical member, said adjustable plate being rotatably and angularly adjustable with respect to the longitudinal axis of said bogie rod to adjust the camber and caster of the wheel mounted thereon.

4. A vehicle as defined in claim 3 in which said adjustable plate is secured to a fixed plate secured to the front end of said cylindrical member, said adjustable plate being rotatably and angularly adjustable with respect to said fixed plate.

5. A vehicle as defined in claim 4 in which the means for the rotational adjustment of said adjustable plate comprises overlapping slots in said adjustable and fixed plates.

6. A vehicle as defined in claim 4 in which the means for the angular adjustment of said adjustable plate comprises a wedge shaped member between said adjustable and fixed plates.

References Cited in the file of this patent

UNITED STATES PATENTS 1,450,472    Wickersham            Apr. 3, 1923

FOREIGN PATENTS 1,216,706    France                Nov. 30, 1959